United States Patent Office 3,142,558
Patented July 28, 1964

3,142,558
FERTILIZER CONTAINING AMMELIDE-UREA MIXTURE
Leland J. Beckham and Fred L. Kelly, Chesterfield County, Va., assignors to Allied Chemical Corporation, New York, N.Y., a corporation of New York
No Drawing. Filed Feb. 19, 1962, Ser. No. 174,283
2 Claims. (Cl. 71—30)

This invention relates to fertilizers and more particularly to fertilizers containing slowly available nitrogen.

Soluble nitrogen fertilizers, such as urea, must be used sparingly to prevent injury to vegetation. Urea, for example, is known to burn plants when employed at the rate of 200 pounds of nitrogen per acre. Since the seasonal nitrogen requirements of vegetation are well above this value, considerable work has been done toward the development of slowly available, "nonburning" fertilizers which will have a prolonged fertilizing period. With a fertilizer of this type it will then become feasible to supply an entire season's nitrogen requirement with only one application without fear that vegetation will be injured.

Materials have heretofore been prepared for the purpose of extending the active fertilizing period of a fertilizer. Amongst them are various condensation products of urea and formaldehyde formed under acidic conditions. These "ureaform" products, however, have a tendency to lose most of their nitrogen availability characteristics when they come in contact with acidic materials and are therefore not completely satisfactory for supplementing the nitrogen content of acidic mixed fertilizers.

It is an object of the present invention to overcome the disadvantages of the prior art and to provide a new and improved method for adding slowly available nitrogen to acidic fertilizer materials.

It is a further object to provide complete fertilizer materials in a form such that a portion of the nitrogen becomes available to plants over a relatively extended period of time.

A still further object is to provide a complete fertilizer containing slowly available nitrogen, which nitrogen does not lose its activity as a fertilizer during storage.

These objects and other advantages can be attained with the use of a mixture of urea and ammelide as a fertilizer medium. For controlled feeding of plant life with the nitrogen becoming available at a substantially uniform rate over an extended period of time, it is essential that the urea to ammelide ratio be held within rather narrow limits, namely 20–30 percent urea to 80–70 percent ammelide. The mixture is particularly well adapted for use with acidic fertilizer materials which have been ammoniated or which have otherwise had their nitrogen content increased by the addition of water-soluble nitrogen compounds. Desirably the urea-ammelide mixture is added in quantities to supply at least about one-half of the total nitrogen of the fertilizer.

The crude ammelide product containing not over 15 percent ammeline and 1 percent cyanuric acid which is obtained as a by-product in the manufacture of cyanuric acid by the pyrolysis of urea has been found to be well suited for use in admixture with urea. Mixed fertilizers containing such material which have been prepared in accordance with the inventive concept have been found to contain insoluble nitrogen of high activity as determined by the neutral permanganate method of the AOAC. ("Official Methods of Analysis of the Association of Official Agricultural Chemists," Seventh Edition, pages 15 and 16.) Furthermore, it has been found that the activity remains high even after prolonged storage of the fertilizer.

The ammelide may, of course, be prepared in many ways. Since cost is an item of some consideration in the manufacture of fertilizer, it is, of course, preferable to obtain the ammelide as cheaply as possible, as for example as a by-product of a commercially valuable product, such as cyanuric acid. This latter material is commonly prepared by the pyrolysis of urea. There are many different ways of making this latter by the pyrolysis of urea. In some instances the urea is pyrolyzed in an inert fluid medium, in a solvent, or even admixed with recycled crude cyanuric acid. In all cases, some ammelide is formed as by-products, and it has been found that when the pyrolysis temperature is maintained between 180° and 250° C. at pressures of 1–10 atmospheres, the ammeline content will be not over 15 percent after the cyanuric acid has been separated therefrom. It is this material, low in ammeline and substantially free of cyanuric acid, which has been found to be an extremely useful fertilizer ingredient. It is important that the cyanuric acid be removed leaving not over 1 percent in admixture with the ammelide not only because of its value as a chemical but because it is toxic to some plants at fertilizer concentrations.

Ammelide-ammeline mixtures, relatively high in ammeline, of the type produced by pyrolysis of urea at high pressures in accordance with the examples of U.S.P. 2,572,587 are not suitable for use as fertilizers. These products nitrify much too slowly in the soil to be considered useful for the purpose.

EXAMPLE A

*Preparation of Ammelide*

200 g. of urea was charged into one liter glass flask fitted with a four-foot glass column one inch in diameter and open to the atmosphere. The charge was then heated to 250° C. over the course of 1¼ hours. During this period, ammonia was evolved and sublimate collected on the walls of the glass column. The pot was cooled and the sublimate was returned to the pot by applying heat to the glass column. This cycle was repeated three times. At this point the evolution of ammonia had ceased, but sublimate still collected in the glass column. The pot residue was extracted twice with three liter portions of boiling water, thereby removing cyanuric acid, and was then dried in an oven at 115° C. The dried material weighed 26 grams and analyzed 43.75 percent N. Theoretical for ammelide is 43.75 percent N. About 97.4 percent of the product was water-insoluble by standard AOAC test.

EXAMPLE B

Recycle crude cyanuric acid (60.6 lb./hr.) is mixed with molten urea (60.5 lb./hr.) and the mixture is fed continuously into a horizontal stainless steel drum, rotating at about 20 revolutions per minute. The drum is heated so that a temperature gradient is maintained through its length, ranging from 180° C. at the feed end to 250° C. at the exit end. The off gases, containing ammonia and volatiles such as vaporized urea, are scrubbed with molten urea to recover urea for return to the reaction drum. Ammonia in the gas leaving the urea scrubber is recovered by absorption in water. Granules progress from the feed end to the discharge end of the tumbling bed in about 1 hour and overflow continuously. The crude cyanuric acid granules thus produced are screened and the smaller particles are recycled to be mixed with molten urea feed. The crude product contains:

| | Weight percent |
|---|---|
| Cyanuric acid | 79.5 |
| Ammelide | 16.8 |
| Ammeline | 1.6 |
| Urea | 0.1 |

The larger particles of crude cyanuric acid are slurried with water (about 10 parts of water per part of crude cyanuric acid) and sufficient ammonia to give about 1 percent ammoniacal solution. A temperature of 90° C. is maintained and the cyanuric acid is dissolved away from the ammelide and ammeline. Filter aid is added to the resulting slurry to increase the filtration rate in the following filtration operation.

The cyanuric acid solution with suspended ammelide, ammeline, and filter aid is pumped from the dissolver and the insolubles are removed in a conventional leaf type pressure filter. The insoluble materials are sluiced from the filter cloth with jets of water and discharged as about a 20 percent solids slurry.

The slurry from the sluicing operation of the insolubles filter flows to a conventional drum type vacuum filter and the insolubles, chiefly ammelide, are separated from the solution. The cake is washed with water to remove retained solution and the filter cake is discharged from the filter and dried in a conventional steam tube rotary drier. Typical dried by-product contains, by weight, 50–70 percent ammelide, less than 1 percent cyanuric acid, 7–12 percent ammeline, and the balance filter aid (analyzing as $SiO_2$).

The by-product ammelide mixture is prepared for use as a fertilizer by mixing with sufficient urea to give a mixture containing 20–30 parts of urea for each 70–80 parts of ammelide.

EXAMPLE 1

Ammelide, as prepared by the method of Example A, was used to determine whether ammelide has any deleterious or toxic effect on oat seed germination and young seedling growth. Soil was maintained at 20 percent water level and 300 g. of dry soil per container was placed in glass containers two inches deep. Fertilizer material was applied at rates of 40 and 100 pounds of nitrogen per acre and mixed throughout the soil. No potash or phosphorus was added. The test crop was oats, 50 percent per container. Test shows comparison of ammelide with urea and a no-nitrogen control. The following table summarizes results and shows that ammelide is not toxic.

| Nitrogen source | Pounds N per acre | Percent germination, 11 days | Average height, inches | Appearance |
|---|---|---|---|---|
| Ammelide | 100 | 100 | 6 | Normal. |
|  | 40 | 100 | 6 | Do. |
| Urea | 100 | 96 | 6 | Do. |
|  | 40 | 92 | 6 | Do. |
| No nitrogen |  | 92 | 6 | Do. |

EXAMPLE 2

*Stability of Ammelide-Urea Mixture in Mixed Fertilizers*

The following test shows that ammelide, as used in our fertilizers, is highly resistant toward loss of availability. A 5–15–10 (5% N, 15% $P_2O_5$, 10% $K_2O$) base fertilizer mixture was prepared by mixing muriate of potash and superphosphate and ammoniating this mixture with 55.5 percent ammonium nitrate, 26.0 percent ammonia, 18.5 percent water solution at an ammoniation ratio of 45 pounds of neutralizing ammonia per 100 pounds of superphosphate. This acidic base mixture, sand, and ammelide prepared as in Example B were then mixed in proportions forming approximately 9–9–6 (9% N, 9% $P_2O_5$, 6% $K_2O$) complete fertilized in which three units of the nitrogen were supplied by the ammonium nitrate-ammonia-water solution and the remaining six units of the nitrogen were supplied by the ammelide product. The mixture was stored for eight weeks at room temperatures of about 25–30° C. After storage the material was analyzed for the activity of the water-insoluble nitrogen by standard AOAC neutral potassium permanganate test on pages 15 and 16 of the Seventh Edition of the "Official Methods of Analysis of the Association of Official Agricultural Chemists." Activity was found to be 95 percent.

Incorporation of urea in weight proportions with the ammelide in the above fertilizer of 20–30:80–70 produces a fertilizer in which the nitrogen remains at least 95% active by the above test after 8 weeks' storage under the above conditions.

EXAMPLE 3

*Plant Test With Fertilizer Containing Ammelide*

The 9–9–6 mixed fertilizer of Example 2 was tested at the rate of 100 pounds fertilizer per acre in greenhouse cultures with German millet. The soil used was a nitrogen deficient light loam soil, pH 6.5. Four pounds of soil was placed in each 5 x 7.5 inch pot and the test fertilizer was mixed with the top four inches of soil. The German millet test crop was thinned to three plants per pot. Plants were harvested at 90 days. The following table shows the influence of the 9–9–6 fertilizer as compared with a 0–9–6 fertilizer treatment at 63 pounds per acre.

| Fertilizer source: | Average dry weight of millet per pot, grams |
|---|---|
| 9–9–6 | 15.15 |
| 0–9–6 | 7.80 |

A still better effect is obtained by use of our fertilizer containing urea:ammelide in weight proportions 20–30:80–70.

EXAMPLE 4

*Soil Nitrification Tests*

These tests show that with judicious mixing of ammelide with urea adequate nitrification can be maintained over the whole growing period. All fertilizers were applied at the rate of 400 pounds of nitrogen per acre ½ foot of soil.

*Soil Nitrification Tests*

| Materials | Analysis of portion used—Total Nitrogen, wt. Percent | Nitrification Data | | | |
|---|---|---|---|---|---|
| | | Three weeks | | Nine weeks | |
| | | Total amount $NO_3$—N, p.p.m.[c] | Percent nitrification [d] | Total amount $NO_3$—N, p.p.m.[c] | Percent nitrification [d] |
| Ammelide plus urea [a] | [b] 33.12 | 109.9 | 36.7 | 142.1 | 44.3 |
| Do [a] | [b] 33.12 | 107.4 | 35.4 | 138.4 | 42.4 |
| Ammelide | 33.12 | 60.2 | 4.0 | 96.7 | 19.2 |
| Do | 33.12 | 63.5 | 11.3 | 107.4 | 25.1 |
| Urea | 46.55 | 184.5 | 77.7 | 199.8 | 75.7 |
| Do | 46.55 | 186.8 | 79.1 | 190.7 | 70.8 |
| A commercial ureaform fertilizer | 38.00 | 113.7 | 38.8 | 160.9 | 54.5 |
| Do | 38.00 | 128.2 | 46.9 | 173.7 | 61.4 |

[a] 75% of total N supplied by ammelide material; remaining 25% supplied by urea. Urea N is being used to increase the number of soil nitrifying bacteria to better attack the ammelide material which is only slowly nitrified.
[b] Total nitrogen figure is for ammelide material only. (Prepared as per Example B.)
[c] The nitrite-N was determined colorimetrically by the procedure given by Jackson in Soil Chemical Analysis, p. 197. Nitrate-N in soil blank was subtracted from that found in each case to give net gain of nitrate-N from the nitrogen material added.

[d] $\text{Percent nitrification} = \dfrac{\text{Net p.p.m. nitrate-N found} \times 100}{\text{p.p.m. N charged}}$ Although certain preferred embodiments of the invention have been disclosed for purpose of illustration, it will be evident that various changes and modifications may be made therein without departing from the scope and spirit of the invention.

We claim:
1. The method of preparing acidic mixed fertilizer comprising mixing potash and superphosphates, ammoniating the mixture, and adding a mixture of urea and ammelide product obtained by the pyrolysis of urea at temperatures of 180°–250° C. under pressure of 1 to 10 atmospheres said ammelide product consisting essentially of ammelide and less than 1% cyanuric acid based on the ammelide therein, the urea:ammelide proportions being confined to 20–30 percent urea and 80–70 percent ammelide.

2. The method of preparing acidic mixed fertilizer which comprises mixing potash and superphosphates, ammoniating the mixture, and adding a mixture of (A) 20–30% urea and (B) 80–70% ammelide product obtained by the pyrolysis of urea at a temperature of 180° to 250° C., under pressure of 1–10 atmospheres, followed by extraction of cyanuric acid with aqueous solvent; said ammelide product consisting essentially of ammelide and containing less than 15% ammeline and less than 1% cyanuric acid based on the ammelide therein.

References Cited in the file of this patent

UNITED STATES PATENTS

| | | |
|---|---|---|
| 1,870,346 | Ripke | Aug. 9, 1932 |
| 2,022,673 | Kniskern et al. | Dec. 3, 1935 |

FOREIGN PATENTS

| | | |
|---|---|---|
| 245,768 | Great Britain | Feb. 10, 1927 |